June 6, 1950  A. V. PEDERSEN  2,510,602
METHOD OF MANUFACTURING CURVED STRUCTURAL ELEMENTS
Original Filed Dec. 29, 1943
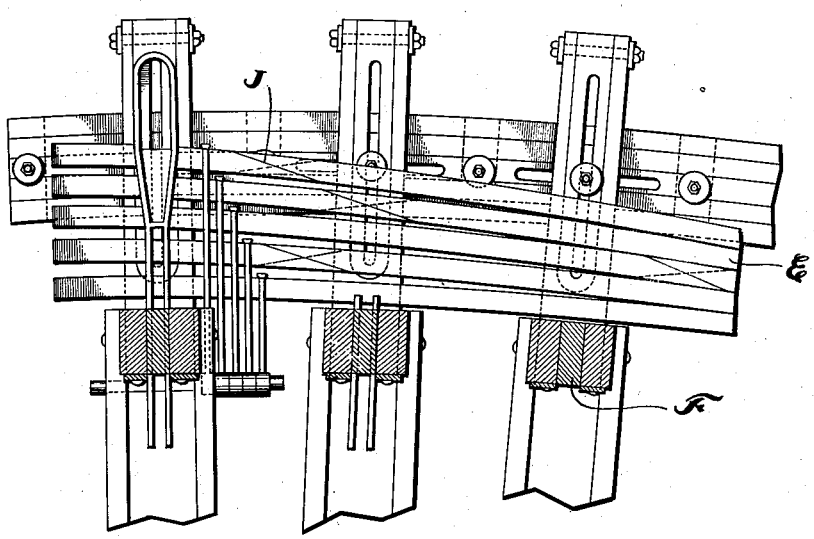
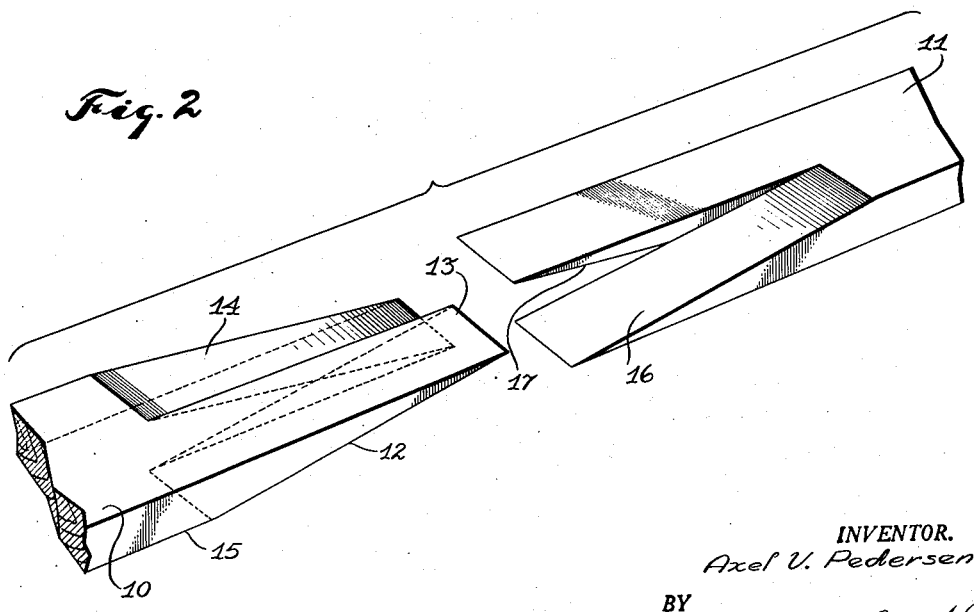
INVENTOR.
Axel V. Pedersen
BY
Hazard & Miller
Attorneys Patented June 6, 1950

2,510,602

UNITED STATES PATENT OFFICE 2,510,602

METHOD OF MANUFACTURING CURVED STRUCTURAL ELEMENTS

Axel V. Pedersen, Los Angeles, Calif.

Continuation of Application Serial No. 516,067, December 29, 1943. This application November 3, 1947, Serial No. 783,772

2 Claims. (Cl. 154—110)

This invention relates to a method of manufacturing laminated structural elements from wood laminations. This application is a continuation of my copending application, Serial No. 516,067, filed December 29, 1943, now abandoned.

Heretofore in the manufacture of structural elements from wood laminations such as, for example, in the manufacture of curved chords of bowstring and other type trusses, curved arches and the like it has been common practice to scarf the adjacent ends of adjoining lamination sections. Single scarfs have been universally employed for this purpose having such slopes that when the scarfed ends of adjoining lamination sections are glued together adequate structural strength will be developed across the joint between the lamination sections. Where single scarfs are employed the customary slope is in the neighborhood of 1 to 10 or 1 to 12 to develop the desired strength in the joint. The use of such slopes is objectionable because of the wastage of wood involved in forming the scarfed ends.

Another objection to the use of single scarfs on the adjacent ends of adjoining laminated sections of curved structural elements resides in the fact that unnecessary labor and time is involved in the gluing up of the element. If the ends of the laminations have complementary single scarfs the scarfed surfaces ordinarily must be glued together to join the lamination sections in end to end relationship. After these sections are thus connected to each other the various laminations that are made up of the lamination sections are then assembled together with adhesive applied to their side faces and bent to the desired shape allowing the glue or adhesive to dry or set while thus bent. Such a procedure involves two separate gluing operations; one in which the scarfed ends are glued together and the second wherein the laminations are bent and glued to each other.

If an attempt is made to simultaneously glue the scarfed ends to each other and to glue the lamination faces to each other the clamps of the gluing frame must be positioned opposite each of the scarfed joints due to the fact that as these scarfs are single scarfs the joints will tend to open under the bending. As it is desirable to have the scarfed joints disposed in staggered relation throughout the structural element it is frequently difficult and sometimes impossible to position the clamps or clamping means opposite each of the scarfed joints to hold the joint closed while the laminations are bent and the adhesive is drying or setting.

An object of the present invention is to provide an improved method of manufacturing structural elements of this character wherein the adjacent ends of adjoining lamination sections are scarfed with oppositely directed double or multiple scarfs capable of transmitting bending moments across the joints because of their shape. In this manner glue or other adhesive may be applied in a single gluing operation to the scarfed faces and other side faces of the lamination sections. These may then be assembled together and bent to the desired curvature such as in a glue frame. As the double scarfs are capable of transmitting bending moments even in the absence of any adhesive whatsoever they will not open during the bending. Consequently, when the adhesive has dried or set firm joints are established between the adjoining lamination sections and the various laminations are fastened to each other in side by side relationship. The time involved in completing the gluing may thus be reduced approximately one-half. Furthermore, by using opposed or double scarfs I find that the slopes of the scarfs may be cut down to approximately 1 to 6 thus materially reducing the wastage of lumber at the end of the lamination sections that is required for scarfing purposes.

With the foregoing and other objects in view, which will be made manifest in the following detailed description and specifically pointed out in the appended claims, reference is had to the accompanying drawings for an illustrative embodiment of the invention, wherein:

Fig. 1 is a top plan view of a portion of a glue frame illustrating lamination sections in assembled relationship thereon and in the process of being bent to the desired curvature wherein the lamination sections are allowed to remain until the adhesive has dried or set; and Fig. 2 is an exploded view of the double scarfed adjacent ends of two adjoining lamination sections.

Referring to the accompanying drawings wherein similar reference characters designate similar parts throughout, in the construction of the structural element embodying the present invention adjoining lamination sections indicated at 10 and 11 have their adjacent ends oppositely or double scarfed thus the section 10 for approximately one-half of its width is scarfed upwardly as indicated at 12 toward the upper face 13 that is a continuation of the upper face of the lamination section. In a corresponding manner the other half of lamination section 10 is downwardly scarfed as indicated at 14 toward the bottom face that constitutes a continuation of the bottom surface 15 of the lamination section. The lamination section 11 is similarly scarfed as indicated at 16 and 17 these scarfs being complementary to the corresponding scarfs 12 and 14. By scarfing the lamination sections in this manner each section has on each end thereof portions that might be regarded as tapered tongues that are oppositely tapered with respect to the thickness of the lamination section. The slopes of the scarfs may vary considerably but should be materially greater than 1 to 1. While the slopes may be as gentle as 1 to 10 or 1 to 12 I find that if the slopes are approximately 1 to 6 that this is ordinarily adequate. The slope should never be more abrupt than 1 to 3. When the lamination sections are thus scarfed they may be assembled together and even in an unglued condition it will be found that the double scarfed joints between adjoining lamination sections are capable of transmitting bending stresses thereacross. Consequently, in making up a curved structural element such as the element generally designated at E on Fig. 1 it is possible to apply adhesive to the scarfed faces 12, 14, 16 and 17 of each joint between adjoining lamination sections and other side faces of the laminations. The lamination sections may then be assembled together in a glue frame generally designated at F with the scarfed joints indicated at J on Fig. 1 preferably in staggered relation to each other. The glue frame may then be tightened up to bend the laminations to the desired curvature and to contact with each other and the glue or other adhesive that is applied to the scarfed faces and to the sides of the lamination sections is allowed to dry or set. When this is completed the element E may be bodily removed from the glue frame and the work is completed except for the application of bolts or other devices that may be required. Due to the fact that the double scarfs on the adjacent end of adjoining lamination sections are capable of transmitting bending stresses even without the application of glue or other fastening means these joints will not open during the bending of the laminations on the glue frame. Furthermore, it is unnecessary to position clamps or other tightening devices on the glue frame opposite the joints J.

It will be appreciated that if the lamination sections 10 and 11 had been single scarfs thereon that the single scarfs are incapable of transmitting bending stresses prior to the drying or setting of the adhesive. Consequently, if single scarfs should be employed, the scarfed surfaces would either have to be glued together in advance of application to the glue frame or the clamps of the glue frame would have to be positioned opposite each scarfed joint to prevent the joint from opening while the laminations were being bent.

An additional feature or advantage of the present method over the use of single scarfs between adjacent ends of adjacent laminations is briefly as follows. If single scarfed lamination sections are first glued-in end to end relationship and are then bent in the course of assembly to make a curved structural element not only are the laminations thus fabricated long and difficult to handle but in the course of the bending the glue between the scarfed ends is prestressed and remains stressed in the completed structural element. By means of the present method inasmuch as the glue between the scarfed faces of adjacent ends of adjoining lamination sections does not dry or set until after the components of the structural element have been assembled together and bent, the glue or adhesive in these joints is not prestressed.

It will be appreciated from the above described method that a new manner of manufacturing curved structural elements is provided which will materially reduce the gluing time normally required in that the gluing of the joints and the gluing of the laminations to each other can be performed simultaneously. Furthermore, as the slopes of the scarfs can be reduced to as low as 1 to 6 a material saving in material is likewise permissible. No particular type of glue frame is required to bend and hold the lamination sections in the desired shape. The glue frame, a portion of which is illustrated, that is quite suitable is a gluing frame of the character disclosed in U. S. Letters Patent No. 2,331,972 issued October 19, 1943, to Robert Greevy. While the number of scarfs on each end of each lamination section is illustrated as consisting of only two scarfs of equal width it will be appreciated that these may be of unequal width and that the number of scarfs may exceed two. However, the number of scarfs should never be less than two due to the fact that a single scarf is incapable of transmitting bending moments prior to gluing and consequently will tend to open in the course of the bending unless otherwise prevented from so doing.

Various changes may be made in the details of construction without departing from the spirit and scope of the invention as defined by the appended claims.

I claim:

1. The method of making laminated curved structural elements which includes forming the adjacent ends of adjoining lamination sections with complementary pairs of opposed scarfs of slopes of not steeper than 1 to 6, applying adhesive to the mutually engageable surfaces of said scarfs, assembling the lamination sections together and bending them to the desired curvature and allowing the adhesive to set while in the bent condition.

2. The method of making curved laminated structural elements which includes forming the adjacent ends of adjoining lamination sections with complementary sets of oppositely tapered tongues of slopes of not steeper than 1 to 6, applying adhesive to the mutually engageable surfaces of said tongues and to the sides of the lamination sections assembling the lamination sections together and bending them to the desired curvature and allowing the adhesive to set while in the bent condition.

AXEL V. PEDERSEN.

REFERENCES CITED

The following references are of record in the file of this patent:

UNITED STATES PATENTS

| Number | Name | Date |
|---|---|---|
| 757,812 | Keyes | Apr. 19, 1904 |
| 1,101,786 | Craine | June 30, 1914 |
| 2,172,093 | Thompson et al. | Sept. 5, 1939 |
| 2,389,944 | Winkel | Nov. 27, 1945 |
| 2,409,383 | Pedersen | Oct. 15, 1946 |